(12) United States Patent
Tanaka

(10) Patent No.: US 11,467,958 B2
(45) Date of Patent: Oct. 11, 2022

(54) CACHE MANAGEMENT METHOD, CACHE MANAGEMENT SYSTEM, AND INFORMATION PROCESSING APPARATUS

(71) Applicant: CASIO COMPUTER CO., LTD., Tokyo (JP)

(72) Inventor: Hirokazu Tanaka, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/208,149

(22) Filed: Mar. 22, 2021

(65) Prior Publication Data

US 2021/0303465 A1 Sep. 30, 2021

(30) Foreign Application Priority Data

Mar. 25, 2020 (JP) .............................. JP2020-053621

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC .................................................. G06F 12/0802
See application file for complete search history.

(56) References Cited

U.S. PATENT DOCUMENTS

| 5,819,102 A | 10/1998 | Reed et al. |
| 5,862,400 A | 1/1999 | Reed et al. |
| 2002/0078124 A1* | 6/2002 | Baylor ................. G06F 9/3851 718/107 |
| 2002/0120814 A1 | 8/2002 | Lee |
| 2004/0103251 A1 | 5/2004 | Alsup |
| 2005/0225558 A1* | 10/2005 | Morein .................... G06F 3/14 345/557 |
| 2008/0263279 A1 | 10/2008 | Ramani et al. |

(Continued)

FOREIGN PATENT DOCUMENTS

| JP | H07-234775 A | 9/1995 |
| JP | 2002-229775 A | 8/2002 |
| JP | 2011-154539 A | 8/2011 |

(Continued)

OTHER PUBLICATIONS

Extended European Search Report dated Oct. 15, 2021 received in European Patent Application No. EP 21163168.4.

(Continued)

*Primary Examiner* — Jae U Yu
(74) *Attorney, Agent, or Firm* — Scully Scott Murphy & Presser

(57) ABSTRACT

A cache management method performed by an information processing apparatus includes: in a case where a correspondence relation between a request and a response to the request is not stored in a first cache, executing a plurality of operations for generating the response to the request; in association with input data of each operation of the plurality of operations, storing a result of the operation in a second cache; storing the response generated based on results of the plurality of operations in the first cache in association with the request; and returning the response with respect to the request.

20 Claims, 13 Drawing Sheets

(56) References Cited

U.S. PATENT DOCUMENTS

2018/0203733 A1    7/2018  Tajima et al.

FOREIGN PATENT DOCUMENTS

| JP | 2011-164749 A | 8/2011 |
| JP | 2018-049308 A | 3/2018 |
| WO | 2017/056310 A1 | 4/2017 |

OTHER PUBLICATIONS

Notice of Reasons for Refusal dated Jan. 18, 2022 received in Japanese Patent Application No. JP 2020-053621 together with an English language translation.

\* cited by examiner

*FIG. 6*

| CACHE KEY | VALUE |
|---|---|
| REQUEST 1 | RESPONSE 1 |
| REQUEST 2 | RESPONSE 2 |
| REQUEST 3 | RESPONSE 3 |
| ... | ... |

REQUEST 1

- IDENTIFIER: 133485
- GRAPH EXPRESSION: y = sin(x)
- RANGE SPECIFICATION: null

- SETTING INFORMATION:
  ANGLE: degree
  THE NUMBER OF DECIMAL PLACES: 2
  COMPLEX NUMBERS: INVALID
  ...

- DRAWING RANGE:
  Xmin: -7.5
  Xmax: 7.5
  Xstep: 0.1
  Ymin: -7.5
  Ymax: 7.5
  Ystep: 0.1
  ...

FIG. 7B

RESPONSE 1

- INFORMATION ON GRAPH
  GRAPH TYPE
  GRAPH DRAWING METHOD
  ERROR PRESENCE/ABSENCE
  ...

- GRAPH COORDINATE POINT LIST
  [-7.5, -0.93]
  [-7.4, -0.89]
  [-7.3, -0.85]
  ...
  [7.4, 0.89]
  [7.5, 0.93]

FIG. 8

| CACHE KEY | EQUATION | VALUE |
|---|---|---|
| y = sin (x) | y = f(x) TYPE | |
| y = sin (x) Xmin: -7.5 Xmax: 7.5 Xstep: 0.1 Ymin: -7.5 Ymax: 7.5 Ystep: 0.1 | [-7.5, -0.93] [-7.4, -0.89] [-7.3, -0.85] ... [7.4, 0.89] [7.5, 0.93] | |
| ... | ... | |

113

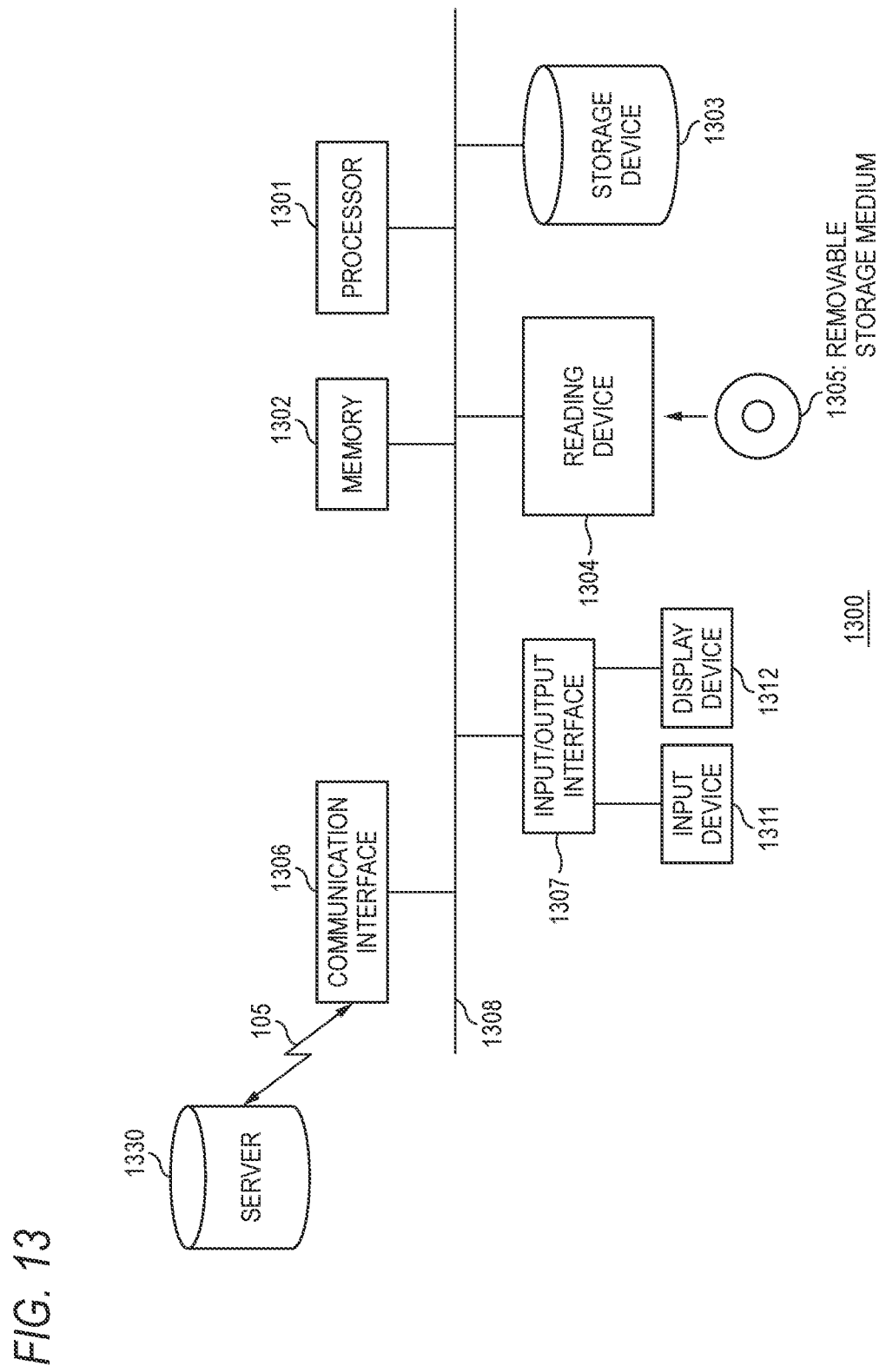

CACHE MANAGEMENT METHOD, CACHE MANAGEMENT SYSTEM, AND INFORMATION PROCESSING APPARATUS

CROSS-REFERENCE TO RELATED APPLICATIONS

This application is based on and claims priority under 35 USC 119 from Japanese Patent Application No. 2020-053621 filed on Mar. 25, 2020, the contents of which are incorporated herein by reference.

TECHNICAL FIELD

The present disclosure relates to a cache management method, a cache management system, and an information processing apparatus.

BACKGROUND ART

In order to speed up operations, caches are used. For example, if data and so on used once are saved in a cache, thereafter or when the same data are used, it is possible to execute operations at high speed.

For example, web browsers save a web page browsed once and images used in that web page in a storage device serving as a cache. As a result, when the same web page is displayed again later, they can read the data from the cache without having to communicate with the server again to acquire the data. Therefore, it is possible to speed up the display.

Also, with respect to the use of caches, a technology for making a response even in an offline state without communication with a server is known (for example, Japanese Patent Application Laid-Open No. 2011-164749).

However, recently, with the development of technology, various web services have been provided, whereby communication load and operation load have increased. For this reason, it is desired to provide further technologies capable of reducing communication load and operation load.

SUMMARY OF INVENTION

An object of the present disclosure is to provide a technology for improving operation efficiency by using caches.

A cache management method related to one aspect of the present disclosure includes: in a case where a correspondence relation between a request and a response to the request is not stored in a first cache, executing a plurality of operations for generating the response to the request; in association with input data of each operation of the plurality of operations, storing a result of the operation in a second cache; storing the response generated based on results of the plurality of operations in the first cache in association with the request; and returning the response with respect to the request.

According to the present disclosure, it is possible to provide a technology for improving operation efficiency by using caches.

Further features of the present invention will become apparent from the following description of exemplary embodiments (with reference to the attached drawings).

BRIEF DESCRIPTION OF DRAWINGS

FIG. 6 is a view illustrating a first cache;

FIG. 7A is a view illustrating a request which is registered in the first cache;

FIG. 7B is a view illustrating a response which is registered in the first cache;

FIG. 8 is a view illustrating a second cache;

FIG. 13 is a view illustrating the hardware configuration of a computer for implementing the information processing apparatus according to the exemplary embodiment.

DESCRIPTION OF EMBODIMENTS

Figure 1:
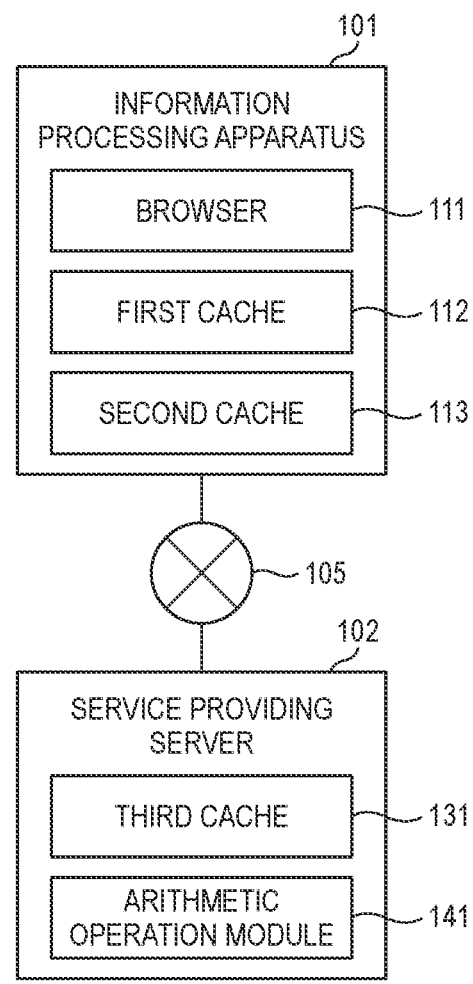
FIG. 1 is a view illustrating a cache management system according to an exemplary embodiment.

Hereinafter, some exemplary embodiments of the present disclosure will be described in detail with reference to the drawings. Further, throughout the plurality of drawings, e1

For example, if a request and a response to that request are stored in a cache, when the same request is received later, it is possible to read and use the response stored in the cache. Therefore, it is unnecessary to perform operations again and it is possible to process the request at high speed.

By the way, there are cases where it is possible to divert some of the results of a plurality of operations which is executed to generate a response to a request, to generate a response to another request. Even in such cases, if the results of the operations which are executed to generate a response are not cached, it is impossible to use them in other operations.

For this reason, in the exemplary embodiment to be described below, with respect to a plurality of operations which is executed to generate a response to a request, input data of the operations and the results of the operations are saved in a cache in association with each other. Therefore, for example, when any other request is received, if operations to be performed to generate a response to the other request include any operation corresponding to the plurality of cached operations, it is possible to speed up the operations by using the cached results.

By the way, as an example of a situation where it is possible to divert the results of operations which are executed to generate a response to a request to another operation, operations which always cause the same result with respect to the same request can be taken. As examples of such operations, arithmetic operations can be taken. The arithmetic operations may include, for example, operations for outputting the results of calculations of mathematical expressions, operations for drawing the graphs of mathematical expressions, operations for obtaining mathematical expressions and graphs of tangents and so on with respect to other mathematical expressions and graphs, operations for obtaining equations or obtaining statistical values such as average and dispersion with respect to data point sets, and so on.

Recently, terminals for performing arithmetic operations according to requests input from users and drawing the results on display screens, such as scientific electronic calculators, have been provided. Also, services for displaying calculation results such as graphs corresponding to mathematical expressions as responses to requests if terminals access a server through a web browser and transmit arithmetic operation requests to the server. However, for example, when an arithmetic operation is performed on a terminal, operation load may be high, whereby operation delay may occur. Also, for example, even when a server is made perform an arithmetic operation through a browser or the like, depending on the arithmetic operation, operation load may be high, whereby delay may occur, or due to the communication time between the terminal and the server, delay may occur. For this reason, it is desired to provide further technologies capable of reducing operation load and communication load for arithmetic operations.

Further, for example, such arithmetic operations have a characteristic in which if the same mathematical expression is calculated, the same calculation result is obtained. For example, when different mathematical expressions are calculated, if a part of one mathematical expression is the same as a part of the other, the results of calculations of the same parts become the same value. Therefore, for example, when requests for processing different mathematical expressions have been received, if there is a part common to the mathematical expressions, with respect to that part, it is possible to divert the calculation result of one request to calculation of the other request. However, in the case where a request and a response to that request have been cached simply in association with each other, since the cache is not hit when any other request is received, even in the case where it is possible to divert the calculation results of some of operations, it is impossible to speed up the operations by the cache. Hereinafter, an example will be described.

For example, it is assumed that a request for graphing the mathematical expression $y=x^2+1$ has been received. In this case, it is assumed that a response including coordinate values representing the shape of the graph is cached simply in association with the request for graphing $y=x^2+1$. In this case, even though another request for graphing $y=x^2+20$ is received later, since it is different from the request for graphing $y=x^2+1$, the cache is not hit. Therefore, it is impossible to use the cache.

However, the calculation results of the parts "$x^2$" of $y=x^2+1$ and $y=x^2+20$ become the same. Therefore, for example, if the coordinate values of the shape of the graph of the part "$x^2$" is saved in a cache, when another request for graphing $y=x^2+20$ is received later, it is possible to divert the coordinate values of the part "$x^2$". As a result, it is possible to reduce the amount of operations for drawing the graph of $y=x^2+20$.

By the way, although arithmetic operations are described as examples herein, the exemplary embodiment is not limited to applications to arithmetic operations. In another exemplary embodiment, the exemplary embodiment may be applied to other operations such as the case of processing character strings such as documents and the case of processing images. Even in this case, for example, it is possible to apply the exemplary embodiment such that while a request for requesting to process a character string, an image, or the like and a response to that request are stored in a first cache 112, in association with each of a plurality of operations which is executed to generate the response, the input data of the operation, such as a character string, an image, or the like, and the result of the operation are stored in a second cache 113 in association with each other. Hereinafter, the exemplary embodiment will be described in more detail.

FIG. 1 is a view illustrating a cache management system 100 according to an exemplary embodiment. For example, in FIG. 1, the cache management system 100 includes an information processing apparatus 101 and a service providing server 102. By the way, the service providing server 102 may be, for example, a computer operating as a server. In another exemplary embodiment, the service providing server 102 may be composed of a plurality of servers. Further, in FIG. 1, the information processing apparatus 101 may communicate with the service providing server 102, for example, through a browser 111, to receive services related to arithmetic operations from the service providing server 102.

The information processing apparatus 101 may be a computer, such as a personal computer (PC), a mobile PC, a tablet terminal, a smart phone, or a mobile phone. The information processing apparatus 101 includes the first cache 112 for storing requests and responses to the requests in association with each other, and the second cache 113 for storing the input data of each of a plurality of operations which is executed to generate a response to a request and the result of the operation in association with each other. Also, the information processing apparatus 101 may be connected to the service providing server 102, for example, through a network 105 such as a public network and the Internet. For example, if receiving a request for requesting an arithmetic operation such as drawing of a graph corresponding to a mathematical expression from a user through the browser 111, the information processing apparatus 101 transmits the request to the service providing server 102.

If the service providing server 102 receives the request from the information processing apparatus 101, it refers to a third cache 131 to find out whether a response to the request has been registered in the cache. If a response corresponding to the request has been registered in the third cache 131, the service providing server 102 provides that response to the information processing apparatus 101. Meanwhile, if a response corresponding to the request has not been registered in the third cache 131, the service providing server 102 executes a plurality of operations required to generate a response to the request, using an arithmetic operation module 141, and generates a response based on the obtained calculation results, and returns it to the information processing apparatus 101. By the way, the arithmetic operation module 141 may be, for example, software for symbolically processing mathematical expressions using a computer. An example of the arithmetic operation module 141 is an arithmetic operation system such as a computer algebra system (CAS).

Further, the service providing server 102 registers the generated response in the third cache 131 in association with the request. As a result, when the same request is received later, it is possible to acquire the response from the third cache 131, so it is possible to provide the response to the service providing server 102 at high speed.

The information processing apparatus 101 can display, for example, mathematical expressions, graphs, and so on corresponding to the request and based on the received response, on the display area of the browser.

However, as described above, in the case where the information processing apparatus transmits a request to the service providing server 102 and acquires a response corresponding to the request on a cloud, due to the communication time between the information processing apparatus 101 and the service providing server 102 and so on, delay may occur in drawing a graph based on a response. For this reason, in the exemplary embodiment, the information processing apparatus 101 tries to locally acquire a response corresponding to a request. Hereinafter, the operations which the information processing apparatus 101 executes will be described in more detail.

Figure 2:
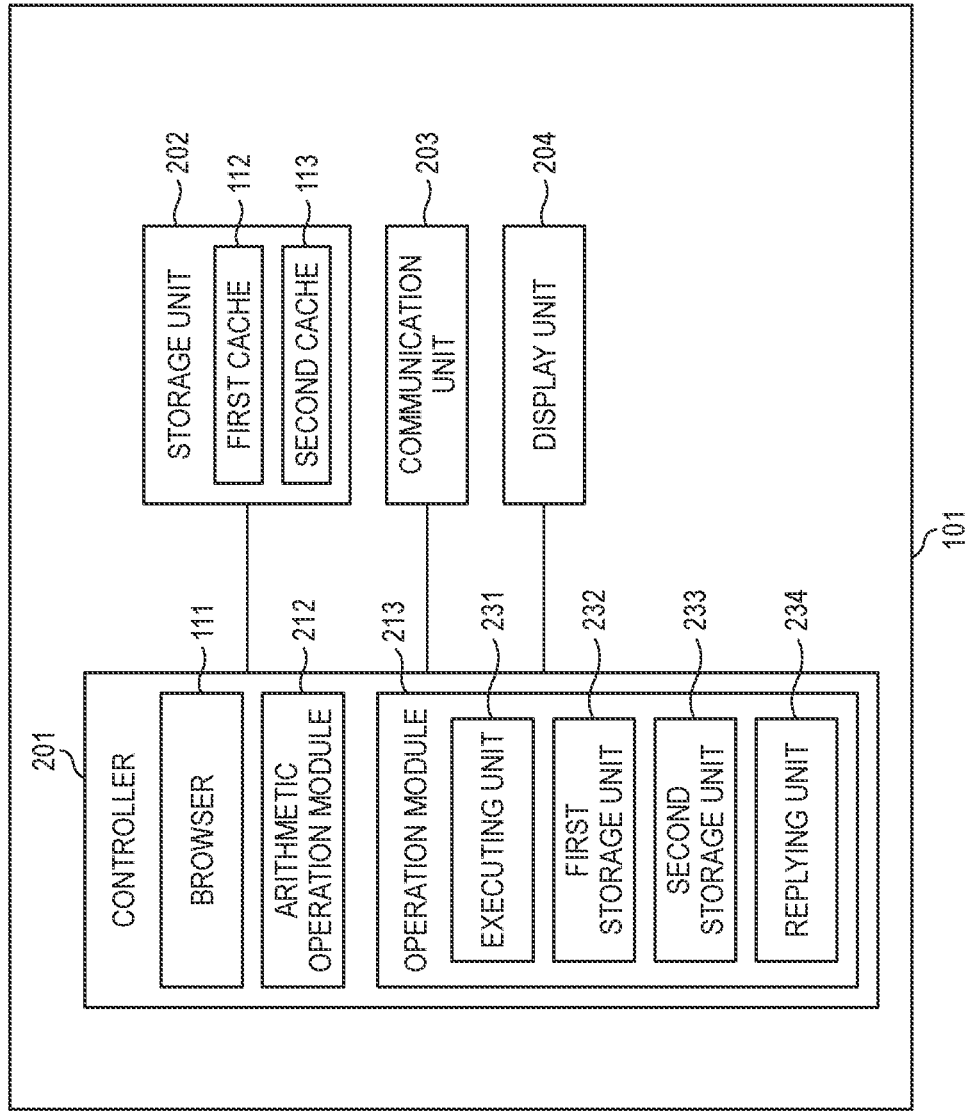
FIG. 2 is a view illustrating the block configuration of an information processing apparatus according to the exemplary embodiment.

FIG. 2 is a view illustrating the block configuration of the information processing apparatus 101 according to the exemplary embodiment. The information processing apparatus 101 includes, for example, a controller 201, a storage unit 202, a communication unit 203, and a display unit 204. The controller 201 may control the individual units of the information processing apparatus 101. In the exemplary embodiment, the controller 201 includes the browser 111, an arithmetic operation module 212 and an operation module 213. For example, the arithmetic operation module 212 may be software for symbolically processing mathematical expressions using a computer, and is, for example, an arithmetic operation system such as a CAS. The operation module 213 executes, for example, operations for controlling reading and writing of information from and to the first cache 112 and the second cache 113. The operation module 213 may include, for example, an executing unit 231, a first storage unit 232, a second storage unit 233, a replying unit 234, and so on, and also may include other functional units. The storage unit 202 includes, for example, the first cache 112 and the second cache 113. The communication unit 203 communicates with other devices, for example, according to instructions of the controller 201. For example, the communication unit 203 may communicate with the service providing server 102. The display unit 204 may be a display device such as a display, and displays information according to instructions of the controller 201. Details of these individual units and details of information stored in the storage unit 202 will be described below.

Figure 3:
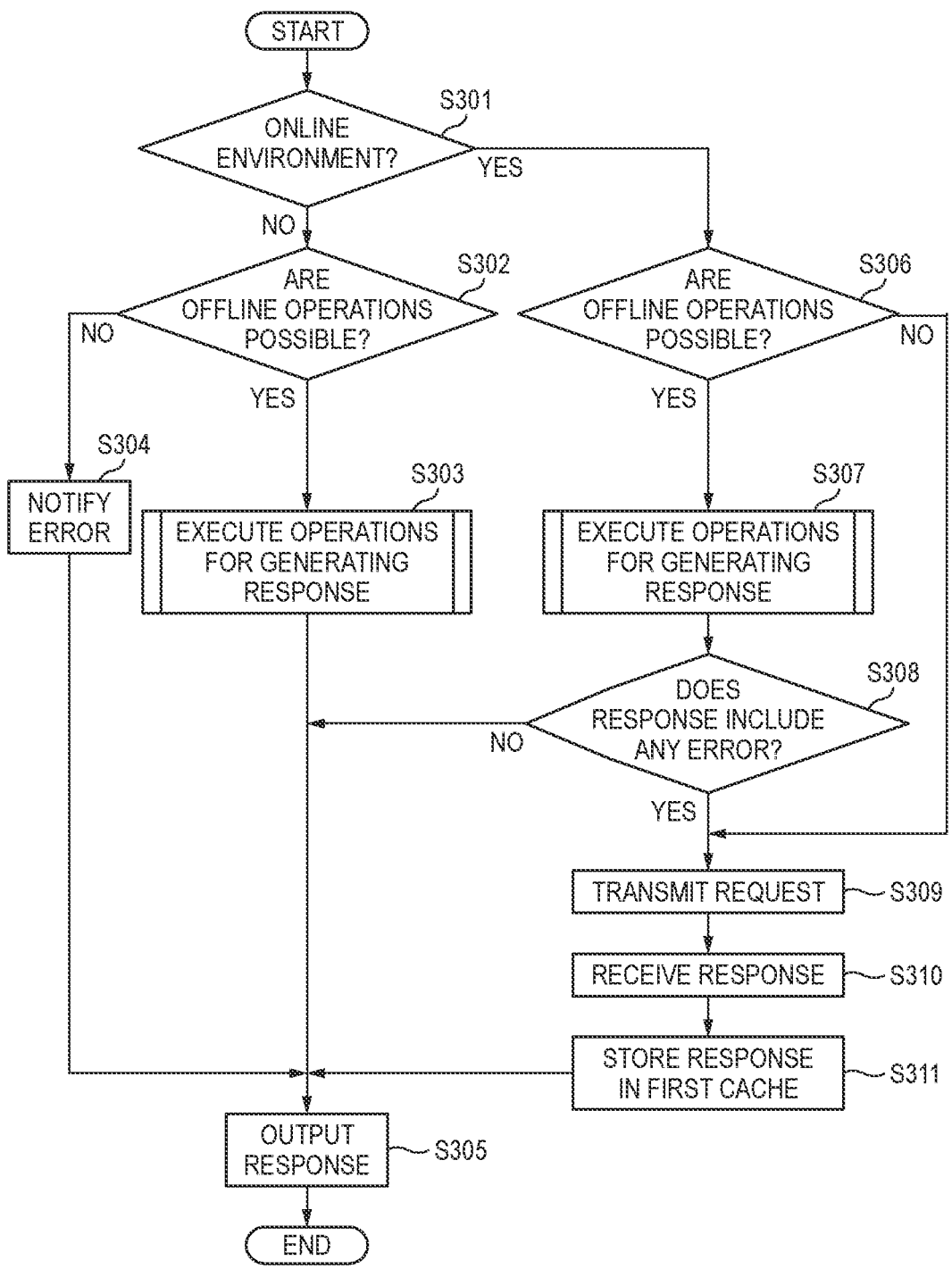
FIG. 3 is a view illustrating the operation flow of operations which the information processing apparatus according to the exemplary embodiment executes in response to a request.

FIG. 3 is a view illustrating the operation flow of operations which the controller 201 of the information processing apparatus 101 executes in response to a request. For example, the controller 201 may start the operation flow of FIG. 3 if a request is input from a user through the browser 111.

In STEP 301 (hereinafter, Step will be written as "S", for example, like S301), the controller 201 of the information processing apparatus 101 determines whether or not it is an online environment. For example, in the case where communication by the communication unit 203 is in an offline state, such as the case where the radio wave condition from a base station for accessing to a public network is bad or the case where the Internet connection status is bad, the controller 201 may determine "NO" in S301, and the flow proceeds to S302.

In S302, the controller 201 determines whether offline operations are possible or not. For example, the controller 201 may determine whether offline operations are possible or not, on the basis of whether or not modules, programs and so on required to generate a response corresponding to the request have been stored in the storage unit 202. In the case of executing a plurality of operations using WebAssembly in order to generate a response, in S302, the controller 201 may determine whether offline operations are possible or not, for example, by determining whether the browser 111 deals with WebAssembly. Also, depending on the implementation of the cache management system 100, it may be configured such that with respect to predetermined requests, the requests are processed by the service providing server 102. As an example, it can be considered to configure the cache management system such that with respect to some arithmetic operations, since operation load is high or special modules are used, requests are processed by the service providing server 102. In this case, the controller 201 may determine "NO" in the operation of S302 when it receives a predetermined request.

In the case where it is determined in S302 that offline operations are not possible ("NO" in S302), the flow proceeds to S304. In this case, since online connection is impossible and offline operations cannot be executed, the controller 201 may notify an error, and the present operation flow may end.

Meanwhile, in the case where it is determined in S302 that offline operations are possible ("YES" in S302), the flow proceeds to S303. In S303, the controller 201 executes operations for generating a response corresponding to the request. Details of the operations for generating a response will be described below with reference to FIG. 9. Subsequently, in S305, the controller 201 outputs the response, and the present operation flow ends.

Also, in the case where it is determined in S301 that it is an online environment in which it is possible to access to the network 105, the controller 201 determines "YES", and the flow proceeds to S306. In S306, the controller 201 determines whether offline operations are possible or not. By the way, in S306, the controller 201 may determine whether offline operations are possible or not, for example, by the same operation as S302. As described above, if it is configured to acquire a response corresponding to a request from the service providing server 102 online, due to the communication time between the information processing apparatus and the service providing server 102, and so on, delay may occur in the operations. For this reason, in the case where offline operations are possible ("YES" in S306), the flow may proceeds to S307 in which offline operations are executed.

In S307, the controller 201 executes the operations for generating a response corresponding to the request. In S307, the same operation as S303 may be performed. By the way, as described above, details of the operations for generating a response will be described below with reference to FIG. 9.

In S308, the controller 201 determines whether the response generated with respect to the request includes any error or not. By the way, errors may be errors such as an error representing that an operation has crashed and an error representing that a timeout has occurred. In the case where the response does not include any error ("NO" in S308), the flow proceeds to S305, and the controller 201 outputs the obtained response.

Meanwhile, in the case where it is determined in S308 that the response includes an error, for example, the error might have occurred in an operation for acquiring the response corresponding to the request, so the correct response might not have been acquired yet. In this case, there is a possibility of succeeding in generating a response when the service providing server 102 executes the operations for generating a response corresponding to the request. For this reason, the controller 201 determines "YES" in S308, and the flow proceeds to S309. Meanwhile, in the case where it is determined in S306 that offline operations are not possible ("NO" in S306), if it is an online environment, since it is possible to request the service providing server 102 to generate a response, the flow proceeds to S309.

In S309, the controller 201 transmits the request to the service providing server 102. If the service providing server 102 receives the request, as described with reference to FIG. 1, the service providing server 102 generates a response corresponding to the request by referring to the third cache 131 and making the arithmetic operation module 141 or the like execute the operations, and returns the response to the information processing apparatus 101.

In S310, the controller 201 receives the response from the service providing server 102. In S311, the controller 201 registers the request transmitted to the service providing server 102 and the response received from the service providing server 102, as a record, in the first cache 112. By the way, details of the first cache 112 will be described below. Consequently, when a request having the possibility of causing an error to be returned in an offline operation is received again, it is possible to return a proper response while avoiding the possibility of an error attributable to an offline operation and delay attributable to communication. By the way, in S311, for example, when the request transmitted to the service providing server 102 is a request including a random function, a shuffle function, or the like whose result changes whenever it is executed, the controller 201 may not execute registration in the first cache 112. Also, in S311, for example, when the response received from the service providing server 102 is a response including an error such as an operation crash or a timeout, the controller 201 may not execute registration in the first cache 112. If the operation of S311 ends, the flow proceeds to S305. In this case, in S305, the controller 201 outputs the response received from the service providing server 102, and the present operation flow ends.

As described above, according to the operation flow of FIG. 3, when a request is input, it is possible to appropriately determine whether to perform generation of a response to the request by the information processing apparatus 101 or by the service providing server 102.

Also, in the operation flow of FIG. 3, for example, when generation of a response corresponding to a request can be executed by offline operations, the operations are executed offline. Therefore, it is possible to reduce communication between the information processing apparatus 101 and the service providing server 102, so it is possible to reduce delay attributable to the communication time.

Also, in an online environment, when offline operations are impossible or an error has occurred in an offline operation, the controller 201 transmits the request to the service providing server 102. Therefore, when it is impossible to generate a response by offline operations, it is possible to execute generation of a response corresponding to the request on a cloud. In the operations of FIG. 3 described above, when an error is determined in S308, the service providing server 102 is requested to process the request; however, the exemplary embodiment is not limited thereto. For example, in another exemplary embodiment, while the operations for generating a response corresponding to the request are locally executed, the operation of S309 may be executed in parallel to request the service providing server 102 to provide a response corresponding to the request. As a result, it is possible to receive a response at an early timing as compared to the case of transmitting the request to the service providing server 102 after an error occurs in a local operation. Further, even in this case, if the received response is not an error, the request and the received response may be stored in the first cache in association with each other.

Also, in an offline environment, in the case where it is impossible to execute generation of a response offline, since an error is notified to the user, the user can see that it is impossible to generate a response corresponding to the request.

Subsequently, the operation of S303 and S307 for generating a response corresponding to the request will be described. By the way, in the exemplary embodiment, the operations for generating a response corresponding to the request may be multithreaded by a main thread 401 which is implemented in JavaScript and a slave thread 402 which is implemented by WebWorker.

Figure 4B:
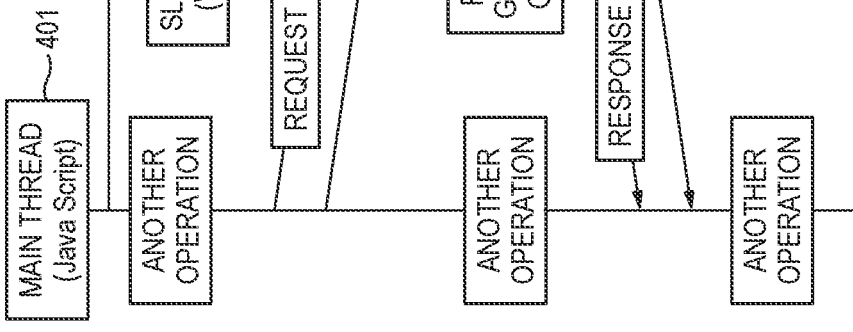
FIG. 4B is a view illustrating threads for executing operations for generating responses corresponding to requests according to the exemplary embodiment.
Figure 4A:
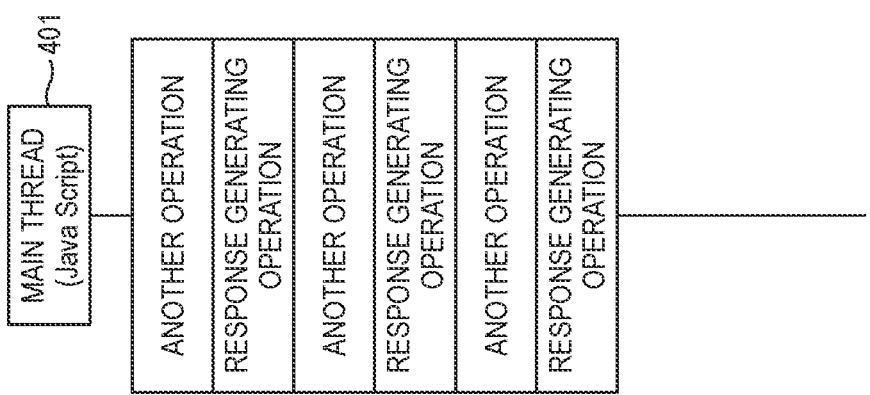
FIG. 4A is a view illustrating a thread for executing operations for generating responses corresponding to requests according to the exemplary embodiment.

FIGS. 4A and 4B are views illustrating threads for executing the operations for generating a response corresponding to a request according to the exemplary embodiment. FIG. 4A illustrates the case of generating a response by one thread, and the thread can be implemented, for example, using JavaScript. However, in this case, since the operations for generating a response and other operations such as an operation for drawing a graph on the display area of the browser 111 are consecutively and subsequently performed in one thread, if a previous operation is not completed, the next operation cannot start. Therefore, for example, there is a risk of causing delay in drawing and so on.

For this reason, in one exemplary embodiment, as shown in FIG. 4B, in addition to the main thread 401, at least one slave thread 402 for executing operations for generating a response is implemented. Each slave thread 402 can be generated, for example, using WebWorker API. Each slave thread 402 has a cache mechanism in the slave thread 402, and can execute exchange of information with the main thread 401 by message events (asynchronous). As shown in FIG. 4B, due to multithreading, while making a slave thread 402 generate a response, the main thread 401 can perform another process such as drawing without waiting for the results of the response generating operations of the slave thread 402. Therefore, it is possible to restrain delay from being caused in other operations such as drawing by the response generating operations. By the way, in one exemplary embodiment, each slave thread 402 refers to a cache assigned to the corresponding thread, but may not refer to caches assigned to other slave threads 402. Depending on the environment, there is the case where it is impossible for slave threads 402 which are implemented using WebWorker to refer to caches assigned to others. For this reason, if each slave thread 402 is configured so as not to refer to caches of the other slave threads 402, it is possible to apply the exemplary embodiment to such a broad range of environments.

By the way, in S303 and S307, the controller 201 may execute the operations for generating a response, for example, by calling the main thread 401 implemented in JavaScript using an application programming interface (API).

Figure 5:
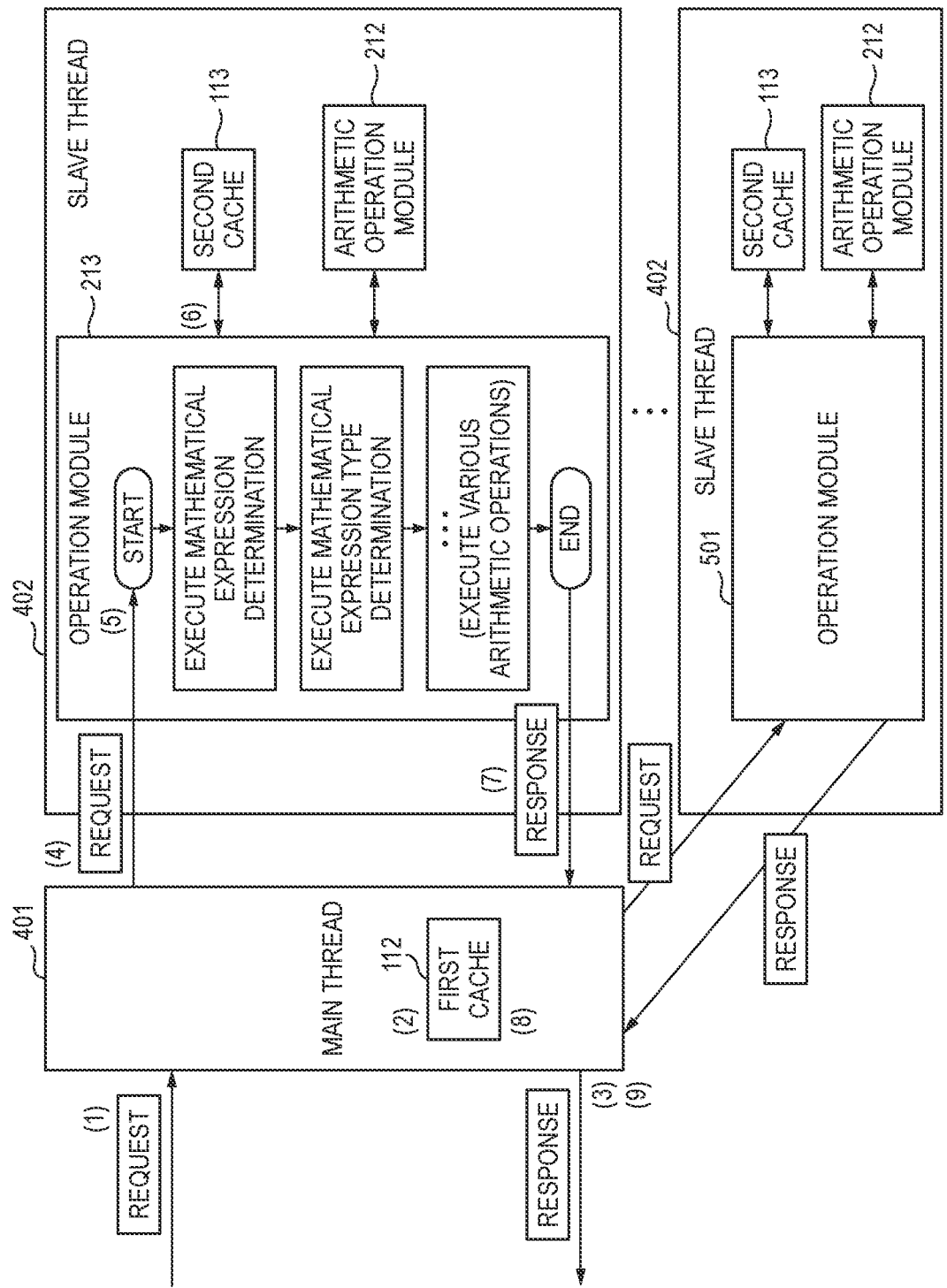
FIG. 5 is a view illustrating the flow of response generation.

Hereinafter, the flow of response generation which is executed by the main thread 401 and a slave thread 402 will be described. FIG. 5 is a view illustrating the flow of response generation. With respect to a request, for example, if the main thread 401 is called in the operation of S303 or S307 described above ((1) of FIG. 5), the main thread 401 checks whether a response corresponding to the request has been stored in the first cache 112 ((2) of FIG. 5).

FIG. 6 is a view illustrating the first cache 112. In the example shown in FIG. 6, in the first cache 112, cache keys and values corresponding to the cache keys have been registered in association with each other. In the first cache 112, as cache keys, requests have been registered, and as values, responses corresponding to the requests have been registered. By the way, as cache keys of the first cache 112, requests themselves can be registered; however, in another exemplary embodiment, for example, values obtained by executing a predetermined operation such as an operation using a hash function on requests may be registered.

FIGS. 7A and 7B are views illustrating the correspondence relation between a request and a response which are registered in the first cache. In FIG. 7A, the request is shown, and in FIG. 7B, the response corresponding to the request is shown. By the way, requests and responses may be, for example, data in JSON (JavaScript Object Notation) format. A of FIG. 7 illustrates a request for requesting to draw a graph on the display screen of the browser, and includes information required for operations for drawing the graph. For example, in A of FIGS. 7A and 7B, the request includes an identifier for identifying the request, a graph expression designating a graph required to be drawn, and a range specification specifying the range of the graph. Also, the request includes a variety of setting information related to the operations for drawing the graph. The setting information may be information designating calculation options such as which of the radian, the degree, and the grade is used for angle in the operations, how many decimal places to round to, and whether complex numbers are valid. Also, the request includes information designating a drawing range for the graph. For example, in FIG. 7, as the drawing range, with respect to each of an X axis and a Y axis, the maximum value and minimum value of the range and the dotting step interval have been designated.

FIG. 7B illustrates the response including information required for drawing the graph corresponding to the request. For example, in FIG. 7B, the response includes information on the graph and a list of the coordinate points of the graph. The information on the graph includes, for example, the type of the graph, and error presence/absence information indicating whether any error has occurred in a plurality of operations performed to generate the response. Further, the list of the coordinate points of the graph includes, for example, information on the coordinates of the individual points of the graph. In the first cache 112, for example, such pairs of requests and responses may be stored in association with each other.

And, in (2) of FIG. 5, if a response corresponding to the request has been stored in the first cache 112, the main thread 401 reads the response corresponding to the request from the first cache 112, and returns the response to the browser 111 which is the caller ((3) of FIG. 5).

Meanwhile, in the case where a response corresponding to the request has not been stored in the first cache 112, the main thread 401 requests the operation module 213 of the slave thread 402 to process the request ((4) of FIG. 5).

If the operation module 213 of the slave thread 402 receives the request, it executes a plurality of operations for generating a response corresponding to the request while referring to the second cache 113 or requesting the arithmetic operation module 212 to execute the operations ((5) of FIG. 5). By the way, in the plurality of operations for generating a response, the operation module 213 may execute a plurality of operations such as mathematical expression determination, mathematical expression type determination, graph point calculation, and so on, using information included in the request. Further details of these exemplary operations will be described below.

And, for example, when the operation module 213 starts to execute the operations, if the results of the plurality of operations for generating a response have been stored in the second cache 113, the operation module proceeds to the next operation of the plurality of operations, using the result of the operations. Meanwhile, if the results of the operations have not been stored in the second cache 113, the operation module requests the arithmetic operation module 212 to execute the operations, and acquires the result of the operations. By the way, in the case of requesting the arithmetic operation module 212 to execute the operations, the operation module 213 may register the pairs of input data of the operations and the results of the operations in the second cache 113 ((6) of FIG. 5).

FIG. 8 is a view illustrating the second cache 113. In the second cache 113, for example, cache keys and values are registered in association with each other. Each cache key may be input data which is for an operation of the plurality of operations which is executed to generate a response and is input in the corresponding operation. Input data may include, for example, some information read from the request, the results of operations performed earlier among the plurality of operations, information generated on the basis of them, and so on. Also, values may be the results of the operations. By the way, as a cache key of the second cache 113, input data for an operation may be registered as it is; however, in another exemplary embodiment, for example, a value obtained by executing a predetermined operation such as an operation using a hash function on the input data may be registered.

Subsequently, the operation module 213 of the slave thread 402 generates a response corresponding to the request on the basis of the results of the plurality of operations, and returns it to the main thread 401 ((7) of FIG. 5). If the main thread 401 receives the response from the slave thread 402, it saves the request and the response in the first cache 112 in association with each other ((8) of FIG. 5). Also, the main thread 401 returns the response received from the slave thread 402, as the response to the request, to the browser 111 which is the caller ((9) of FIG. 5), whereby the operation of S303 or S307 of FIG. 3 ends, and the flow proceeds to the next process.

By the way, a plurality of slave threads 402 for executing response generation may be implemented, and the main thread 401 may add requests to the task queue, thereby making available slave threads 402 of the plurality of slave threads 402 process the requests sequentially.

As described in the flow of response generation of FIG. 5, in the first cache 112, a request and a response corresponding to the request are stored in association with each other. Meanwhile, in the second cache 113, with respect to each of the plurality of operations which is executed for generating the response corresponding to the request, the input data of the operation and the result of the operation are stored in association with each other.

Also, in the main thread 401, when the controller 201 receives a request, it checks whether that request has been registered in the first cache 112, and if it has been registered, the controller acquires a response corresponding to the request from the first cache 112, and returns it to the browser 111. Therefore, in the case where the same request has been processed in the past, it is possible to speed up the operations using the first cache 112.

Also, in the slave thread 402, when the controller 201 operating as the operation module 213 executes the plurality of operations for generating a response corresponding to the request, it checks whether the operations have been registered in the second cache 113. And, if an operation has been registered in the second cache 113, the controller 201 acquires the result of the operation from the second cache 113, and proceeds to the next operation. Therefore, for example, if some of the plurality of operations which need to be executed with respect to the received request were performed when another request was processed in the past, it is possible to speed up the operations using the second cache 113.

By the way, as described above, in arithmetic operations, the operation module 213 executes a plurality of operations such as mathematical expression determination, mathematical expression type determination, graph point calculation and so on using information included in the request while requesting the arithmetic operation module 212 to execute the operations. Further, in the second cache 113, in association with input data for the plurality of operations, the results of the operations may be registered. Hereinafter, with respect to the plurality of operations, examples will be described in brief.

(1) Mathematical Expression Determination Operation

In mathematical expression determination, the operation module 213 determines, for example, whether a graph expression designated by the request is an equation or not. For example, in the case where the operation module 213 receives the request of FIG. 7A, it may read the graph expression $y=\sin(x)$, and check whether $y=\sin(x)$ is an equation or not. For example, in the case where the user is let input an equation to be graphed, the user may input a character string which cannot be graphed. In this case, the operation module 213 may determine an error by mathematical expression determination. As examples of the case where a character string which cannot be graphed is input, the case where only a constant term such as "3" or a variable term such as "y" is input, the case where description of an equal or an inequation is incorrect, and so on can be taken.

Herein, since $y=\sin(x)$ is an equation, as the result of the above-mentioned mathematical expression determination, the input data $y=\sin(x)$ and "Equation" which is the result of the determination are registered in the first stage record of the second cache 113 of FIG. 8.

(2) Mathematical Expression Type Determination Operation

In mathematical expression type determination, the operation module 213 determines which type of graph types such as $y=f(x)$ type and $x=f(y)$ type of an orthogonal coordinate system and $r=f(\theta)$ type of a polar coordinate system the graph expression "$y=\sin(x)$" belongs to. If the graph expression designated by the request is an expression in which the left side is y and the right side does not include any independent variable other than x, it is determined that the graph expression is the $y=f(x)$ type of the orthogonal coordinate system. Also, if the graph expression is an expression in which the left side is x and the right side does not include any independent variable other than y, it is determined that the graph expression is the $x=f(y)$ type of the orthogonal coordinate system. Further, if the graph expression is an expression in which the left side is r and the right side does not include any independent variable other than $\theta$, it is determined that the graph expression is the $r=f(\theta)$ type of the polar coordinate system.

Herein, since $y=\sin(x)$ is the $y=f(x)$ type of the orthogonal coordinate system, as the result of the above-mentioned mathematical expression type determination, the input data. $y=\sin(x)$ and "$y=f(x)$ Type" which is the determination result are registered in the second stage record of the second cache 113 of FIG. 8.

For example, as described above, the operation module 213 can determine the types of graph expressions. By the way, the input data of the operation from Process 1 to Process 3 described in the mathematical expression type determination, and the result of the operation are registered in the second stage record of the second cache 113 of FIG. 8.

(3) Graph Point Calculation Operation

In graph point calculation, the operation module 213 calculates the coordinate values of graph points included in the drawing range with respect to the graph expression of the request. For example, the request of FIG. 7A designates the graph expression $y=\sin(x)$, and a graph range defined by Xmin, Xmax, Xstep, Ymin, Ymax, and Ystep which are −7.5, 7.5, 0.1, −7.5, 7.5, and 0.1, respectively. In graph point calculation, the controller 201 may obtain the coordinates of the graph points included in the designated range. In the third stage record of the second cache 113 of FIG. 8, a record corresponding to the graph point calculation is registered. In the record, the graph expression $y=\sin(x)$ is registered as the input data, and the drawing range, and the coordinate values of the individual points which are the result of the operation are registered as values.

For example, as described in (1) to (3), the controller 201 may execute the plurality of operations for generating a response corresponding to a request, and register the result of each operation in the second cache 113 in association with the input data of the corresponding operation. By the way, the plurality of operations for generating a response is an example, and the exemplary embodiment is not limited thereto. For example, depending on exemplary embodiments, some of the plurality of operation described above may not be executed, or further operations may be executed separately.

Subsequently, with respect to the flow of the response generating operations described above, the operation flow will be described below.

Figure 9:
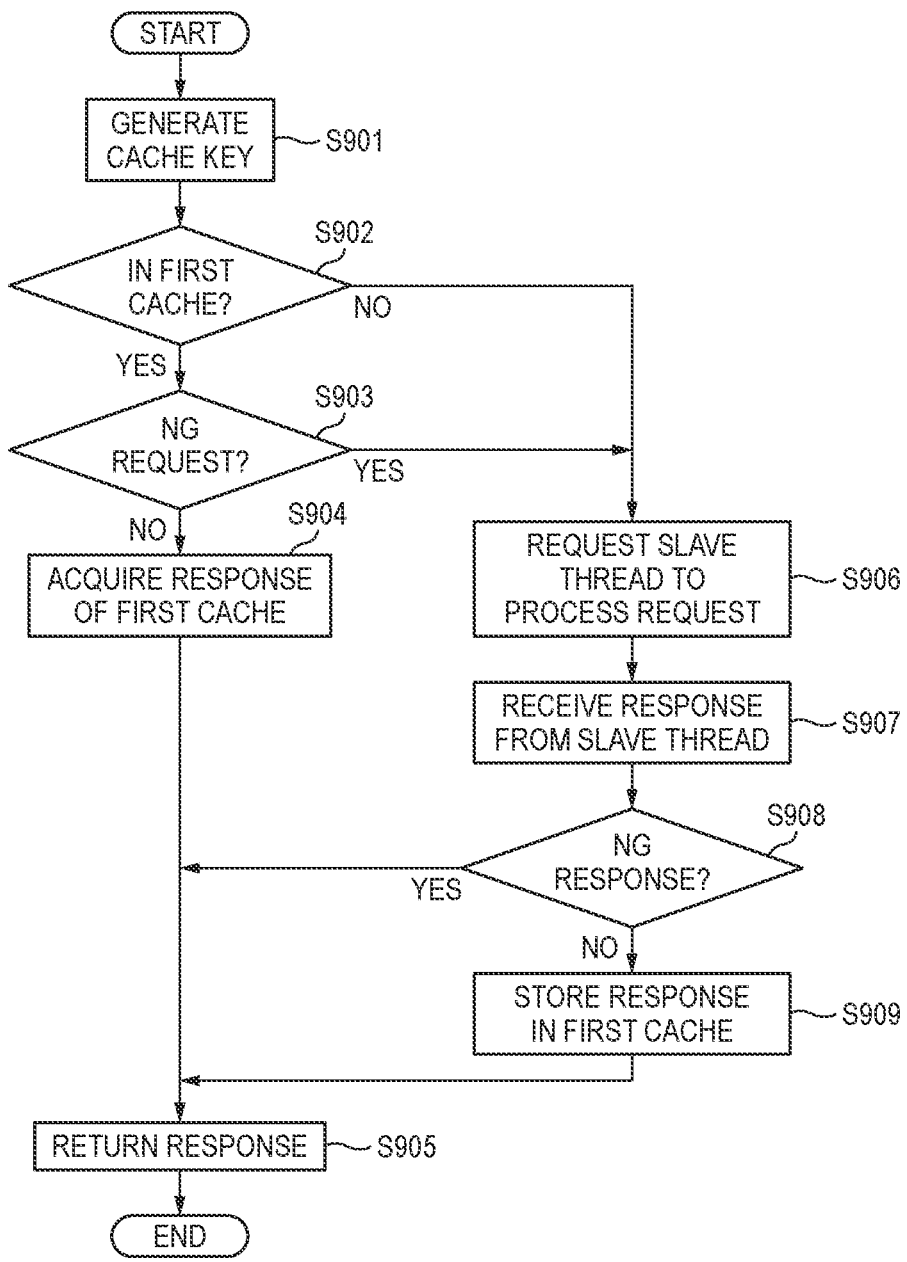
FIG. 9 is a view illustrating the operation flow of operations for generating a response according to the exemplary embodiment.

FIG. 9 is a view illustrating the operation flow of the operations for generating a response which is executed by the controller 201 operating as the main thread 401 according to the exemplary embodiment. For example, if the flow proceeds to S303 or S307, the controller 201 may call the operations of FIG. 9 through API and executes them.

In S901, the controller 201 operating the main thread 401 generates a cache key for searching the first cache 112. For example, in the case where a past request has been registered in the cache key of the first cache 112, the controller 201 may use the request as it is as the cache key. Also, for example, in the case where a value obtained by executing the predetermined operation such as an operation using a hash function has been registered in the cache key of the first cache 112, the controller 201 may execute the same operation on the request, thereby generating the cache key.

In S902, the controller 201 searches the first cache 112 for the generated cache key, thereby determining whether a record corresponding to the request has been registered in the first cache 112 or not. In the case where a record corresponding to the request has not been registered in the first cache 112 ("NO" in S902), the flow proceeds to S906. Meanwhile, in the case where a record corresponding to the request has been registered in the first cache 112 ("YES" in S902), and the flow proceeds to S903.

In S903, the controller 201 determines whether the request is an NG request satisfying a predetermined condition or not. An NG request may be, for example, a request which causes the content of the response to the request to change with each execution. The reason is that, for example, in the case where the content of the response to the request changes with each execution, even though the same request has been registered in the first cache 112, since the registered response and the response to the current request may differ in the contents, it is impossible to divert the cached value. By the way, as examples of the request which causes the result to change with each execution, requests including a random function, a shuffle function, or the like can be taken.

In the case where it is determined in S903 that the request is not an NG request satisfying the predetermined condition ("NO" in S903), the flow proceeds to S904. In S904, the controller 201 acquires the response corresponding to the request from the first cache 112, and in S905, it returns the response to the operation of S303 or S307 which is the caller, and the present operation flow ends.

Meanwhile, in the case where it is determined in S903 that the request is an NG request ("YES" in S903), the flow proceeds to S906. In S906, the controller 201 requests the slave thread 402 to process the request. For example, the controller 201 registers the task of the request in the task queue, thereby making the slave thread 402 execute the operations corresponding to the request.

In S907, the controller 201 receives the response from the slave thread 402. In S908, the controller 201 determines whether the response is an NG response satisfying a predetermined condition. An example of NG responses satisfying the predetermined condition may be an error response representing the state where a correct response to the request cannot be generated. The error response includes, for example, an operation crash, a timeout error, etc. In the case where the response is an NG response ("YES" in S908), the flow proceeds to S905, and in S905, the controller 201 may return the response determined as an NG response to the operation of S303 or S307 which is the caller. By the way, in the case of returning an NG response to S307, in S308, an error may be determined, and in the operation of S309, the request may be transmitted to the service providing server 102. As a result, it is possible to execute the operations by the service providing server 102, and it is possible to improve the possibility of obtaining a correct response to the request.

Meanwhile, in the case where it is determined in S908 that the response is not an NG response ("NO" in S908), the flow proceeds to S909. In S909, the controller 201 registers the request and the response in the first cache 112 in association with each other, and the flow proceeds to S905 in which the controller returns the response to the operation of S303 or S307 which is the caller, and the present operation flow ends.

According to the operation flow of FIG. 9 described above, in the main thread 401, in the case where a response corresponding to a request has been registered in the first cache 112, the controller 201 can return that response. Therefore, it is possible to return the response to the request at high speed.

Also, according to the operation flow of FIG. 9, in the main thread 401, in the case of requesting the slave thread 402 to generate a response corresponding to a request, the controller 201 stores a response received from the slave thread 402 in the first cache 112 in association with the request. Therefore, thereafter, in the case of receiving the same request, it is possible to process it at high speed by using the response stored in the first cache 112.

By the way, in the operation of S909, in the case where a request is an NG request including a random function, a shuffle function, or the like, the controller 201 may not store the request and the response in the first cache 112.

Figure 10:
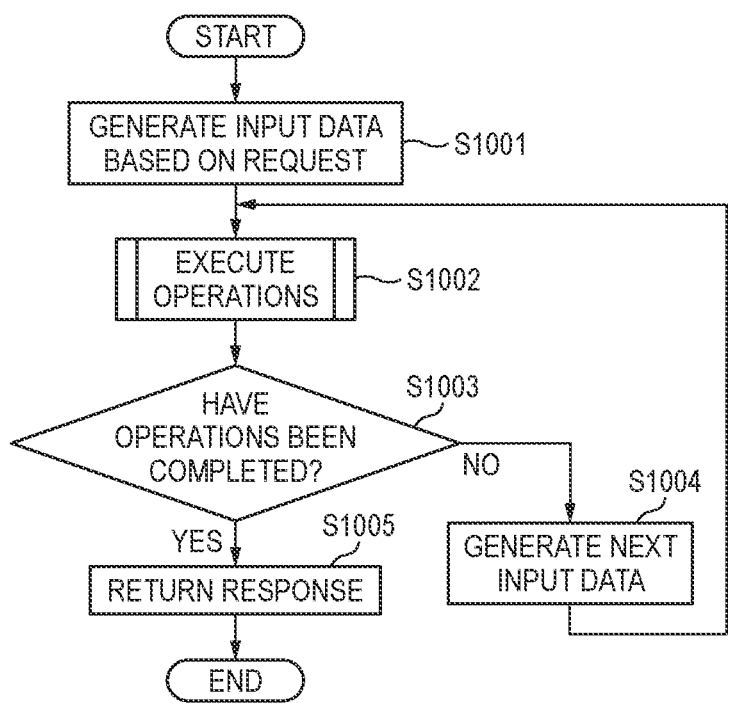
FIG. 10 is a view illustrating the operation flow of operations which a slave thread according to the exemplary embodiment executes to generate a response.

Subsequently, the operations for generating a response corresponding to a request which are executed by the controller 201 operating as the slave thread 402 will be described. FIG. 10 is a view illustrating an operation flow showing the operations which are executed to generate a response corresponding to a request according to the exemplary embodiment. In the slave thread 402, the controller 201 may start the operation flow of FIG. 10, for example, if a task is assigned from a task queue in which tasks corresponding to requests are registered.

In S1001, the controller 201 operating as the slave thread 402 generates input data to be used in the operations, on the basis of the request of the assigned task. For example, the controller 201 may extract some of the information included in the request (for example, a graph expression and so on) as input data.

In S1002, the controller 201 executes the operations on the input data. By the way, the operations from S1002 to S1004 are a repetitive operations. And, in S1002, while executing the series of operations for generating a response to the request sequentially from the first one, the controller 201 may proceed to the next operation whenever it is repeated. For example, in the case of arithmetic operations, the series of operations may include operations such as mathematical expression determination, mathematical expression type determination, graph point calculation, and so on. And, in S1003, the controller 201 determines whether the series of operations for generating a response to the request has been completed or not. In the case where the series of operations for generating a response to the request has not been completed ("NO" in S1003), the flow proceeds to S1004.

In S1004, the controller 201 generates the next input data. For example, the controller 201 may generate the next input data by reading other information from the request or using the result of the operation of S1002. If the next input data is generated, the flow returns to S1002 in which the controller 201 may execute the next operation of the series of operations for generating a response, using the generated next input data.

Also, in the case where it is determined in S1003 that all of the series of operations for generating a response corresponding to the request has been completed ("YES" in S1003), the flow proceeds to S1005.

In S1005, the controller 201 may generate a response on the basis of the results of the series of operations, and returns the response to the main thread 401 by adding the generated response to the queue in which the results of the operations are registered or any other method.

Figure 11:
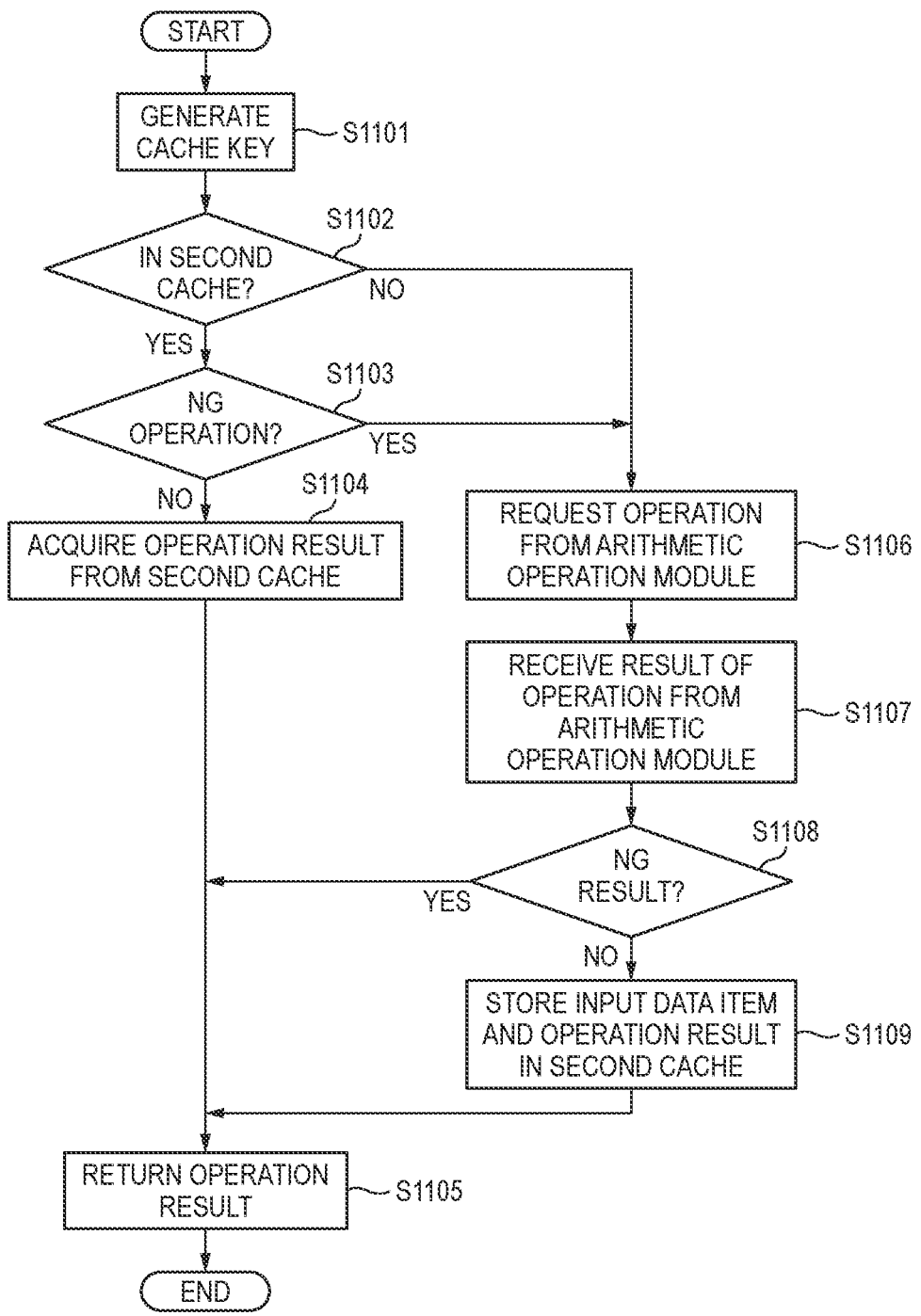
FIG. 11 is a view illustrating the operation flow of operations corresponding to input data.

Subsequently, the operations which are performed in S1002 will be described with reference to FIG. 11. FIG. 11 is a view illustrating the operation flow of the operations which correspond to input data and are performed in S1002. For example, the controller 201 operating as the slave thread 402 may start the operation flow of FIG. 11 if the flow proceeds to the operation of S1002.

In S1101, the controller 201 operating as the slave thread 402 generates a cache key for searching the second cache 113 from the input data. For example, in the case where the past input data has been registered as they are as cache keys in the second cache 113, the controller 201 may use the input data as it is as the cache key. Also, for example, in the case where values obtained by executing the predetermined operation such as an operation using a hash function have been registered as cache keys in the second cache 113, the controller 201 may execute the same operation on the input data, thereby generating a cache key.

In S1102, the controller 201 searches the second cache 113 for the generated cache key, thereby determining whether a record corresponding to the input data has been registered in the second cache 113. In the case where a record corresponding to the input data has been registered in the second cache 113 ("YES" in S1102), the flow proceeds to S1103.

In S1103, the controller 201 determines whether the input data designates an NG operation satisfying a first condition. Input data designating an NG operation may be, for example, input data designating an operation whose result changes whenever it is executed. The reason is that, for example, in the case where the result of the operation changes whenever it is executed, even though a record corresponding to the same input data has been registered in the second cache 113, since the same operation result is necessarily obtained during the next execution, it is impossible to divert the cached value. By the way, as examples of input data designating an operation whose result changes whenever it is executed, information designating operations including a random function, a shuffle function, or the like can be taken.

In the case where it is determined in S1103 that the input data does not designate an NG operation satisfying the first condition ("NO" in S1103), the flow proceeds to S1104. In S1104, the controller 201 acquires a calculation result corresponding to the input data from the second cache 113, and returns the calculation result to the operation of S1002 which is the caller, and the present operation flow ends.

Meanwhile, in the case where it is determined in S1102 that a record corresponding to the input data has not been registered in the second cache 113 ("NO" in S1102), and it is determined in S1103 that the input data designates an NG operation ("YES" in S1103), the flow proceeds to S1106. In this case, since it is impossible to acquire the result of the operation from the second cache 113, in S1106, the controller 201 requests the arithmetic operation module 212 to execute the operation corresponding to the input data. By the way, in the case of an NG operation, in S1106, the controller requests the arithmetic operation module 212 to execute the operation, whereby it is possible to prevent the result of the operation registered in the second cache 113 from being diverted although it cannot be diverted. Also, the operation which is requested from the arithmetic operation module 212 in S1106 may differ, for example, depending on the input data or which operation of the series of operations for generating a response to the request is executed when the operation of FIG. 11 is called. The operation which is requested from the arithmetic operation module 212 may be an operation such as mathematical expression determination, mathematical expression type determination, graph point calculation, etc.

In S1107, the controller 201 receives the result of the requested operation from the arithmetic operation module 212. In S1108, the controller 201 determines whether the result of the operation is an NG result satisfying a second condition. An NG result satisfying the second condition may be, for example, a result including an error indicating the state where acquisition of the result of calculation of the input data has not succeeded. Examples of the error include an operation crash, a timeout error, etc. In the case where the result of the operation is an NG result ("YES" in S1108), in S1105, the controller may return the NG result to the operation of S1002 which is the caller. In this case, it is possible to prevent the result of the operation from being registered although it is impossible to divert the result to another operation.

Meanwhile, in the case where it is determined in S1108 that the result of the operation is not an NG result ("NO" in S1108), the flow proceeds to S1109. In S1109, the controller 201 registers the input data and the result of the operation in the second cache 113 in association with each other, and the flow proceeds to S1105 in which the controller returns the result of the operation to the operation of S1002 which is the caller, and the present operation flow ends. By the way, in S1109, the controller 201 may not store the input data and the result in the second cache 113 in the case where the input data is for an NG operation including a random function, a shuffle function, etc.

According to the operation flows of FIG. 10 and FIG. 11 described above, in the slave thread 402, the controller 201 executes a series of operations for generating a response corresponding to a request. Further, when the series of operations is executed, if the result of an operation is registered in the second cache 113, the controller 201 uses that operation result. Therefore, it is possible to execute the operations at high speed.

Meanwhile, when the series of operations is executed, if the result of an operation has not been registered in the second cache 113, the controller 201 requests the operation from the arithmetic operation module 212, and stores the input data of that operation and the result of the operation in the second cache 113 in association with each other. Therefore, thereafter, in the case where the same operation is executed, it is possible to perform the operation at high speed using the result of the operation stored in the second cache 113.

Further, according to the exemplary embodiment described above, in the first cache 112 and the second cache 113, data with different granularities are registered. For example, in the above-described exemplary embodiment, the granularity of information which is registered in the first cache 112 is greater than the granularity of information which is registered in the second cache 113.

As described above, in the first cache 112, requests and responses are registered in association with each other. Therefore, in the case where an input request has been registered in the first cache 112, it is possible to read a response from the first cache 112 and immediately return the response. However, in this case, if the input request is completely the same as a request registered in the first cache 112, it is impossible to speed up the operation.

Meanwhile, there is the case where it is possible to divert some of the results of a plurality of operations which is executed to generate a response to a request to operations for generating a response to another request, for example, like arithmetic operations. In this case, as described in the exemplary embodiment, with respect to each of the plurality of operations which is executed according to the request, input data of the operation and the result of the operation are registered in the second cache 113 such that it is possible to divert the result to operations for generating a response to another request. As a result, it is possible to speed up the operations for obtaining responses to requests, and reduce operation load.

Figure 12:
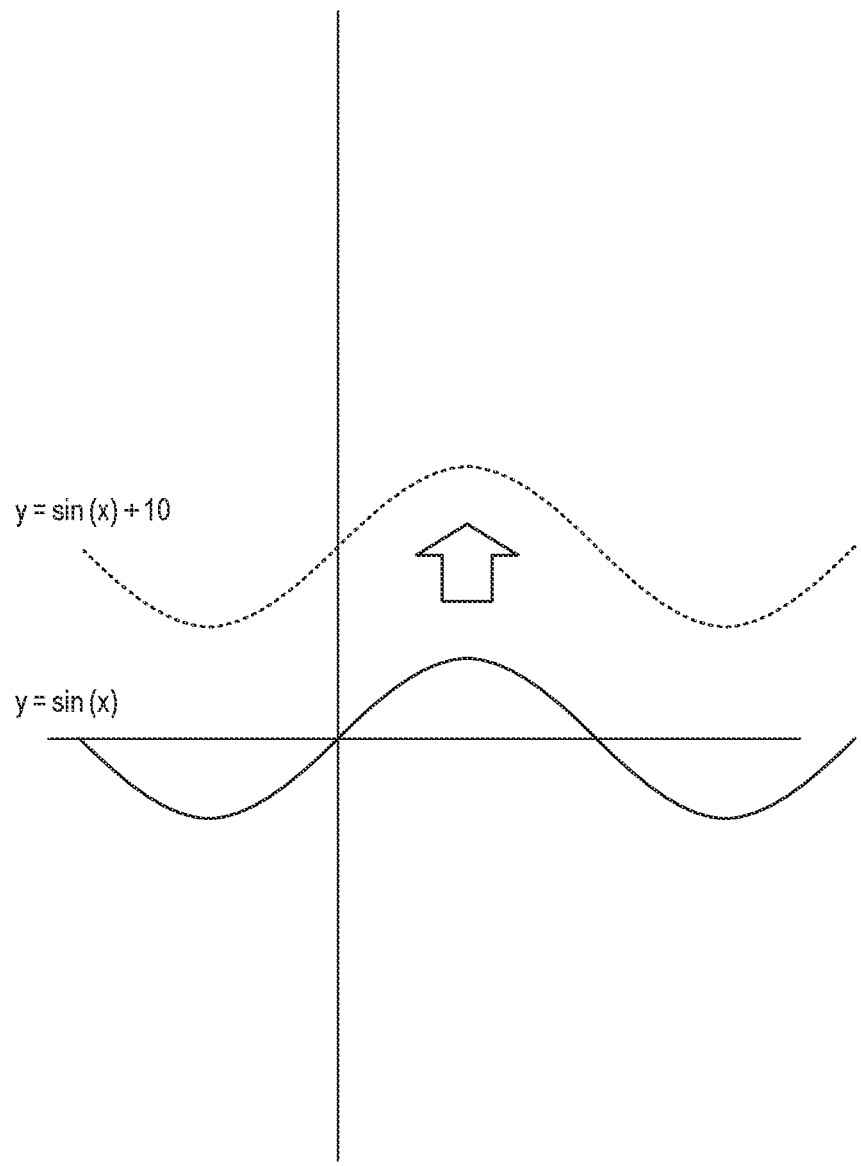
FIG. 12 is a view for explaining the use of caches having different granularities according to the exemplary embodiment.

FIG. 12 is a view for explaining the use of caches having different granularities according to the exemplary embodiment. For example, it is assumed that, in the information processing apparatus 101, the controller 201 is for executing operations for drawing graphs corresponding to mathematical expressions on the display screen of the display unit 204. Further, it is assumed that the controller 201 receives a request which designates y=sin(x)+a and is for consecutively drawing graphs while gradually increasing the value of a by 1 in a range of 0≤a≤10.

In this case, the controller 201 first sets a to 0 and executes the series of operations for generating the graph of y=sin(x), and displays the graph based on the obtained response on the display screen. Also, the controller 201 records the request of y=sin(x) and the response including the coordinate values of the individual points of the graph in the first cache 112. Further, in the exemplary embodiment, the controller records the results of the operations in the second cache 113 in association with input data of the plurality of requested operations which is executed to generate the graph of y=sin(x). For example, the controller 201 may record the coordinate values of the individual points of the graph in the second cache 113, in association with the input data y=sin(x) which is the mathematical expression of a part of y=sin(x)+a.

In this case, for example, in the case of subsequently setting a to 1 and generating the graph of y=sin(x)+1, since in the first cache 112, only the response corresponding to the request of y=sin(x) has been registered and the registered request is different from y=sin(x)+1, it is impossible to acquire information usable to generate the graph from the first cache 112. However, in the second cache 113, the coordinate values of the individual points of the graph have been registered in association with the input data y=sin(x). Therefore, when generating the graph with respect to the request of y=sin(x)+1, the controller 201 can read the coordinate values of the graph of sin(x) which is a part of y=sin(x)+1 from the second cache 113. Therefore, it is possible to execute the operations at high speed as compared to the case of executing every calculation. Similarly, even in the case of drawing the graph of y=sin(x)+a in the range of 2≤a≤10, by reading the coordinate values of the graph of y=sin(x) from the second cache 113, it is possible to execute the operations at high speed while reducing operation load.

Further, after the controller 201 draws all graphs by setting a to 10 and drawing the graph of y=sin(x)+10, in the case of drawing the graph of y=sin(x) again, since the corresponding response has been registered in the first cache 112, it becomes unnecessary to execute calculations using the arithmetic operation module 212. Therefore, it is possible to further reduce operation load and further speed up the operations.

By the way, herein, the example using the information of the second cache 113 is described taking the case where a part is common to the mathematical expressions, as an example; however, examples in which the effect of the second cache 113 can be expected are not limited thereto. For example, it is assumed that a request which designates the same mathematical expression and instructs to draw the graph in a different drawing range is received. In this case, since the same mathematical expression is used, it is possible to acquire the result of determination such as mathematical expression determination, mathematical expression type determination, etc. from the second cache 113, so it is possible to reduce operation load and speed up the operations.

As described above, in the case of operations such as arithmetic operations which always cause the same result with respect to the same request, if one of a plurality of operations which is executed to generate a response to a request is the same as one of a plurality of operations which is executed to generate a response to another request, it may be possible to divert the result of the operation executed earlier to the operation which is executed later. In this case, according to the exemplary embodiment, since the response to a request is cached and input data of the plurality of operations which is executed to generate the response and the results of the operations are also cached in association with each other, it is possible to reduce operation load and speed up the operations.

By the way, in the above-described exemplary embodiment, since the first cache 112 and the second cache 113 are stored in the information processing apparatus 101, referring to the caches from other devices may be restricted depending on the situation. Meanwhile, the third cache 131 of the service providing server 102 can be shared by a plurality of information processing apparatuses 101 which access to the service which the service providing server 102 provides, and a plurality of accounts registered in the service. Therefore, in the case of providing responses with respect to requests from the plurality of information processing apparatuses 101 and the accounts by the third cache 131, it is possible to cache various requests and responses, and it is possible to increase the hit rate.

Although the exemplary embodiment has been illustrated above, the exemplary embodiment is not limited thereto. For example, the above-described operation flows are examples, and the exemplary embodiment is not limited thereto. If possible, each operation flow may be executed in a different order of operations, or may include other operations, or some operations may be omitted.

Also, in the above-described exemplary embodiment, the example in which the information processing apparatus 101 calls the main thread 401, the slave thread 402, and so on from the browser 111 and uses the caches having different granularities has been described. However, the exemplary embodiment is not limited thereto. For example, in another exemplary embodiment, the first cache 112 and the second cache 113 may be integrated into one cache. For example, as shown in FIG. 4A described above, in the case of executing every operation on a request by the main thread 401, the controller 201 may register input data of operations and information on the result of the operations which are registered in the second cache 113 in the above-described exemplary embodiment, in the first cache 112.

Also, in another exemplary embodiment, the controller 201 may execute an operation for synchronizing information between the first cache 112 and the second cache 113. For example, the controller 201 may execute an operation for registering records registered in the first cache 112, in the second cache 113, or may execute an operation for registering records registered in the second cache 113, in the first cache 112. Therefore, for example, even in the first cache 112, it is possible to refer to input data of the plurality of operations for generating responses corresponding to requests, and calculation results. Also, for example, even in the second cache 113, it is possible to refer to requests, and responses corresponding to the requests. If the caches are configured as described above, it is possible to speed up the operations depending on the implementation. For example, in the above-described exemplary embodiment, in the case where the operations which are executed by the slave thread 402 are executed even by the main thread 401, since it is possible to acquire the results of the plurality of operations for generating a response by the first cache 112 of the main thread 401, it becomes possible to execute the operations of the main thread 401 at high speed.

Also, in the above-described exemplary embodiment, the example in which a second cache 113 is provided for each slave thread 402 has been described. In this case, since different data depending on each slave thread 402 are accumulated in the second caches 113, it may be impossible for each slave thread to use data registered in the second caches 113 of other slave threads 402. However, the exemplary embodiment is not limited thereto. For example, in another exemplary embodiment, the controller 201 may execute an operation for synchronizing the contents of the second caches 113 among the slave threads 402 by registering data newly registered in the second cache 113 of a slave thread 402 even in the second cache 113 of the other slave threads 402. Alternatively, the exemplary embodiment may be configured such that the plurality of slave threads 402 refers to one common second cache 113.

Further, in the above-described exemplary embodiment, the example in which the information processing apparatus 101 executes the operations through the browser 111 has been described. Therefore, the form of implementation may be restricted due to the specifications of JavaScript, WebWorker, and so on related to the browser 111. However, the exemplary embodiment is not limited to the operations which are executed through the browser 111. For example, in another exemplary embodiment, the browser 111 may not be used. For example, the exemplary embodiment may be implemented in an application for executing drawing of graphs corresponding to mathematical expressions in the information processing apparatus 101. In this case, the controller 201 may register and manage the contents registered in the first cache 112 and the second cache 113 in one cache, and execute the operations.

Also, in the above-described exemplary embodiment, in the operations of FIG. 9, in the case where the first cache 112 is hit and a request is not an NG request, the operation ends without requesting the slave thread 402 to process the request. However, in another exemplary embodiment, even in the case where the first cache 112 is hit and a request is not an NG request, the slave thread 402 may be requested to process the request. For example, in the case where there are not many requests and the controller 201 has room on the operation capability, if the slave thread 402 is requested to execute the operations as described above, it is possible to accumulate the input data of the operations and the results in the second cache 113.

By the way, in the above-described exemplary embodiment, in the operation of S1002, the controller 201 operates, for example, as the executing unit 231. Also, in the operation of S909, the controller 201 operates, for example, as the first storage unit 232. In the operation of S1109, the controller 201 operates, for example, as the second storage unit 233. In the operation of S905, the controller 201 operates, for example, as the replying unit 234.

FIG. 13 is a view illustrating the hardware configuration of a computer 1300 for implementing the information processing apparatus 101 according to the exemplary embodiment. The hardware configuration of FIG. 13 for implementing the information processing apparatus 101 includes, for example, a processor 1301, a memory 1302, a storage device 1303, a reading device 1304, a communication interface 1306, an input/output interface 1307, an input device 1311, and a display device 1312. By the way, the processor 1301, the memory 1302, the storage device 1303, the reading device 1304, the communication interface 1306, and the input/output interface 1307 are connected to one another, for example, through a bus 1308.

The processor 1301 may be, for example, a single processor, a multiprocessor, or a multi-core. The processor 1301 may operate as the controller 201, the browser 111, the arithmetic operation module 212, the main thread 401, the slave thread 402 (the operation module 213), and so on of the above-described exemplary embodiment, for example, by reading and executing a program. Also, the processor 1301 operates as the executing unit 231, the first storage unit 232, the second storage unit 233, and the replying unit 234, for example, by executing a program such as a cache management program describing the procedures of the above-described operation flows, using the memory 1302.

The memory 1302 is, for example, a semiconductor memory, and may include a RAM area and a ROM area. The storage device 1303 is, for example, a hard disk, a semiconductor memory such as a flash memory, or an external storage device. By the way, RAM stands for Random Access Memory. Also, ROM stands for Read Only Memory.

The reading device 1304 accesses to a removable storage medium 1305 according to an instruction of the processor 1301. The removable storage medium 1305 can be implemented, for example, with a semiconductor device, a medium for inputting and outputting information by magnetic actions, a medium for inputting and outputting information by optical actions, etc. By the way, the semiconductor device is, for example, a USB (Universal Serial Bus) memory. Also, the medium for inputting and outputting information by magnetic actions is, for example, a magnetic disk. The medium for inputting and outputting information by optical actions is, for example, a CD-ROM, a Blu-ray Disc (Blu-ray is a registered trademark), etc. CD stands for Compact Disc. DVD stands for Digital Versatile Disk.

The storage unit 202 includes, for example, the memory 1302, the storage device 1303, and the removable storage medium 1305. For example, in the storage device 1303, the first cache 112 and the second cache 113 are stored.

The communication interface 1306 communicates with other devices according to instructions of the processor 1301. For example, the communication interface 1306 may transmit and receive data to and from the service providing server 102 through the network 105, by wire or wireless communication. The communication interface 1306 is an example of the above-described controller 201.

The input/output interface 1307 may be, for example, an interface for devices for executing input and output. The input/output interface 1307 may be connected to the input device 1311 such as a keyboard, a mouse, a touch panel, etc. for receiving instructions from the user. Also, for example, the input/output interface 1307 is connected to the display device 1312. The display device 1312 may be, for example, a device for displaying information, such as a display, a projector, etc. For example, the display screen of FIG. 12 may be displayed on the display device 1312 connected to the input/output interface 1307. The display device 1312 is an example of the above-described display unit 204. The input/output interface 1307 may be connected to other output devices, such as an audio device such as a speaker and a printing device such as a printer.

Each program according to the exemplary embodiment can be provided to the information processing apparatus 101, for example, in the following forms.

(1) It is installed in the storage device 1303 in advance.
(2) It is provided by the removable storage medium 1305.
(3) It is provided from a server 1330 such as a program server through the network 105.

By the way, the server 1330 may have, for example, the hardware configuration of the computer 1300 of FIG. 13.

By the way, the hardware configuration of the computer 1300 for implementing the information processing apparatus 101, described with reference to FIG. 13, is an example, and the exemplary embodiment is not limited thereto. For example, some parts of the above-described configuration may be removed, or new components may be added. Also, in another exemplary embodiment, for example, some or all functions of the controller 201 described above may be implemented as hardware using an FPGA, an SoC, an ASIC, a PLD, etc. By the way, FPGA stands for Field Programmable Gate Array. SoC stands for System-on-a-chip. ASIC stands for Application Specific Integrated Circuit. PLD stands for Programmable Logic Device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-053621, filed Mar. 25, 2020 which is hereby incorporated by reference wherein in its entirety.

The invention claimed is:

1. A cache management method performed by an information processing apparatus, the cache management method comprising:
in a case where a correspondence relation between a first request and a first response to the first request is not stored in a first cache,
executing a plurality of operations for generating the first response to the first request;
in association with input data of each operation of the plurality of operations, storing a result of the each operation in the first cache and/or a second cache;
storing the first response generated based on results of the plurality of operations in the first cache in association with the first request; and
returning the first response with respect to the first request;
in a case where a correspondence relation between a second request and a second response to the second request is stored in the first cache, returning the second response read from the first cache; and
in a case where the correspondence relation between the second request and the second response to the second request is not stored in the first cache,
executing a plurality of operations for generating the second response to the second request; and
although a correspondence relation between input data of a second operation of the plurality of operations for generating the second response to the second request and a result of the second operation corresponding to the input data is stored in the second cache, in a case where the input data of the second operation designates an operation satisfying a first condition, the result of the second operation is not acquired from the first cache and/or the second cache.

2. The cache management method according to claim 1, further comprising:
in association with the input data of the each operation of the plurality of operations, storing the result of the each operation in the first cache.

3. The cache management method according to claim 1, further comprising:
in a case where the correspondence relation between input data of a first operation of the plurality of operations for generating the second response to the second request and a result of the first operation corresponding to the input data is stored in the second cache, acquiring the result of the first operation from the second cache.

4. The cache management method according to claim 1, wherein the second request is a request related to an arithmetic operation.

5. The cache management method according to claim 1, wherein with respect to an operation whose result satisfies a second condition, input data and a result of the operation are not stored in the second cache.

6. The cache management method according to claim 1, further comprising:
executing the plurality of operations for generating the first response to the first request by one thread of a plurality of threads; and
in association with the input data of the each operation of the plurality of operations, storing, by the one thread, the first result of the operation in the second cache assigned to the one thread.

7. The cache management method according to claim 6, wherein the one thread is not configured to refer to caches assigned to the other threads of the plurality of threads.

8. The cache management method according to claim 1, wherein in the case where the correspondence relation between the first request and the first response to the request is stored in the first cache, acquiring the first response to the first request from the first cache.

9. The cache management method according to claim 1, wherein the first request and/or the second request is a request related to an arithmetic operation.

10. The cache management method according to claim 1, wherein the first condition is that the result of the second operation changes with each execution.

11. The cache management method according to claim 5, wherein the second condition is that the result of the operation includes an error indicating a state where acquisition of the result has not succeeded.

12. A cache management system comprising:
an information processing apparatus; and
a server,
wherein the information processing apparatus is configured to:
in a case where a correspondence relation between a first request and a first response to the first request is not stored in a first cache,
execute a plurality of operations for generating the first response to the first request;
in association with input data of each operation of the plurality of operations, store a result of the each operation in the first cache and/or a second cache;
store the first response generated based on results of the plurality of operations in the first cache in association with the first request; and
return the first response to the first request;
in a case where a correspondence relation between a second request and a second response to the second request is stored in the first cache, return the second response read from the first cache; and
in a case where the correspondence relation between the second request and the second response to the second request is not stored in the first cache,
execute a plurality of operations for generating the second response to the second request; and
although a correspondence relation between input data of a second operation of the plurality of operations for generating the second response to the second request and a result of the second operation corresponding to the input data is stored in the second cache, in a case where the input data of the second operation designates an operation satisfying a first condition, the result of the second operation is not acquired from the first cache and/or the second cache.

13. The cache management system according to claim 12, wherein the information processing apparatus is further configured to:
in a case where an error occurs in the plurality of operations for generating the response to the request, transmit the request to the server; and
receive the first response to the first request from the server.

14. The cache management system according to claim 12, wherein the information processing apparatus is further configured to:
in response to receiving the first request, execute the plurality of operations for generating the first response to the first request and transmit the first request to the server; and
receive the first response to the first request from the server.

15. The cache management system according to claim 13, wherein the information processing apparatus is configured to store the first response received from the server, in the first cache.

16. The cache management system according to claim 13, wherein the server is configured to store the first response generated based on the results of the plurality of operations according to the request, in a third cache.

17. The cache management system according to claim 16, wherein in the third cache, a third response generated from results of a plurality of operations with respect to a third request received from another computer is stored in association with the third request, and
wherein in a case where the server receives the first request that is the same as the third request from the information processing apparatus, the server is configured to notify, as the first response to the first request, the information processing apparatus of the third response.

18. The cache management system according to claim 12, wherein the first request and/or the second request is a request related to an arithmetic operation.

19. An information processing apparatus comprising:
at least one processor, wherein the processor is configured to:
in a case where a correspondence relation between a first request and a first response to the first request is not stored in a first cache,
execute a plurality of operations for generating the first response to the first request;
in association with input data of each operation of the plurality of operations, store a result of the each operation in the first cache and/or a second cache;
store the first response generated based on results of the plurality of operations in the first cache in association with the first request; and
return the first response to the first request;
in a case where a correspondence relation between a second request and a second response to the second request is stored in the first cache, return the second response read from the first cache; and
in a case where the correspondence relation between the second request and the second response to the second request is not stored in the first cache,
execute a plurality of operations for generating the second response to the second request; and
although a correspondence relation between input data of a second operation of the plurality of operations for generating the second response to the second request and a result of the second operation corresponding to the input data is stored in the second cache, in a case where the input data of the second operation designates an operation satisfying a first condition, the result of the second operation is not acquired from the first cache and/or the second cache.

20. The information processing apparatus according to claim 19,
wherein the first request and/or the second request is a request related to an arithmetic operation.

* * * * *